Figure 1:
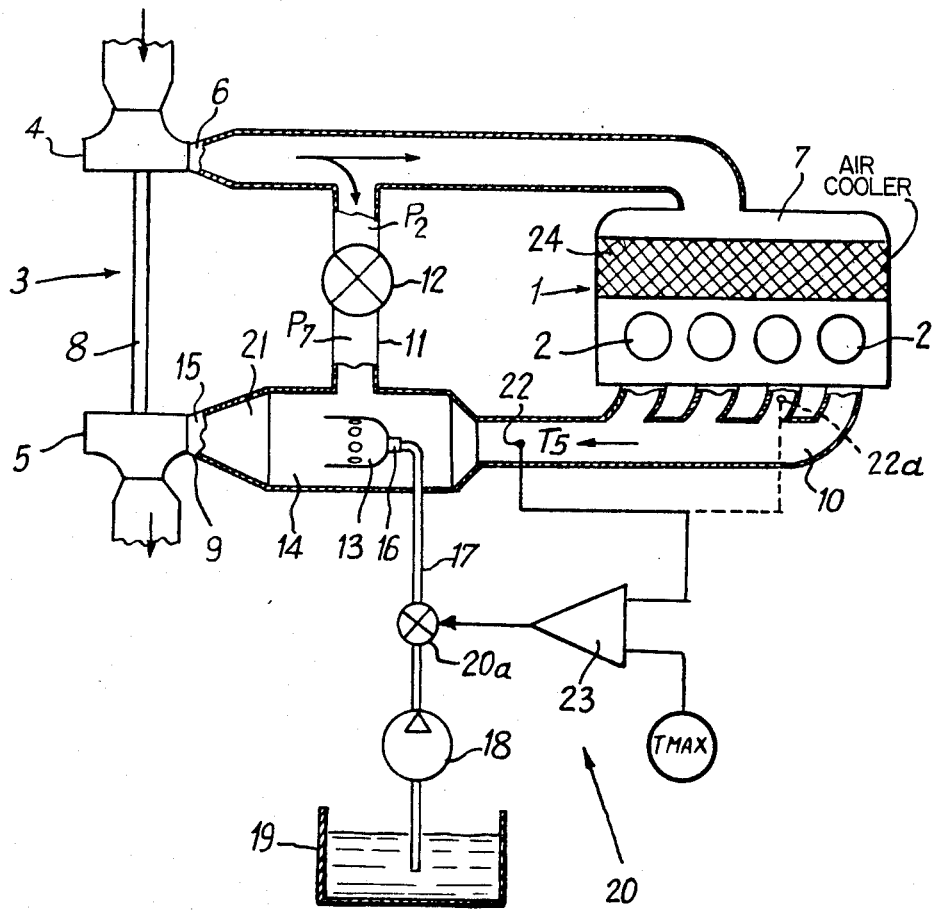

United States Patent [19]

Melchior et al.

[11] Patent Number: 4,616,481
[45] Date of Patent: Oct. 14, 1986

[54] SUPERCHARGED INTERNAL COMBUSTION ENGINES HAVING A BYPASS CONDUIT AND AN AUXILIARY COMBUSTION CHAMBER WHICH ARE PROVIDED WITH A REGULATING SYSTEM

[75] Inventors: Jean Melchior; Thierry Andre, both of Paris; Alain Dourille, Elancourt, all of France

[73] Assignee: French State, France

[21] Appl. No.: 696,217

[22] Filed: Jan. 29, 1985

[30] Foreign Application Priority Data

Jan. 30, 1984 [FR] France .................. 84 01355

[51] Int. Cl.[4] ............................ F02B 37/00
[52] U.S. Cl. ................................... 60/606
[58] Field of Search ............................ 60/606

[56] References Cited

U.S. PATENT DOCUMENTS

| | | | |
|---|---|---|---|
| 2,608,051 | 8/1952 | Nettel | 60/606 |
| 3,163,984 | 1/1965 | Dumont | 60/606 |
| 4,114,379 | 9/1978 | Melchior | 60/606 |
| 4,160,365 | 7/1979 | Petrov | 60/606 |
| 4,389,846 | 6/1983 | Butscher | 60/606 |

*Primary Examiner*—Douglas Hart
*Attorney, Agent, or Firm*—Barnes, Kisselle, Raisch, Choate, Whittemore & Hulbert

[57] ABSTRACT

An internal combustion engine (1), supercharged by a turbocompressor (3), comprises a bypass conduit (11) in which is placed an auxiliary combustion chamber (14). The primary zone (13) of this chamber (14) receives fuel whose flow is determined by regulating means (20). These means (20) vary this flow in the same direction as a parameter which is a characteristic of the load of the engine (1), in particular the temperature of the gases measured in the exhaust of the engine (1) by a sensor (22).

13 Claims, 4 Drawing Figures

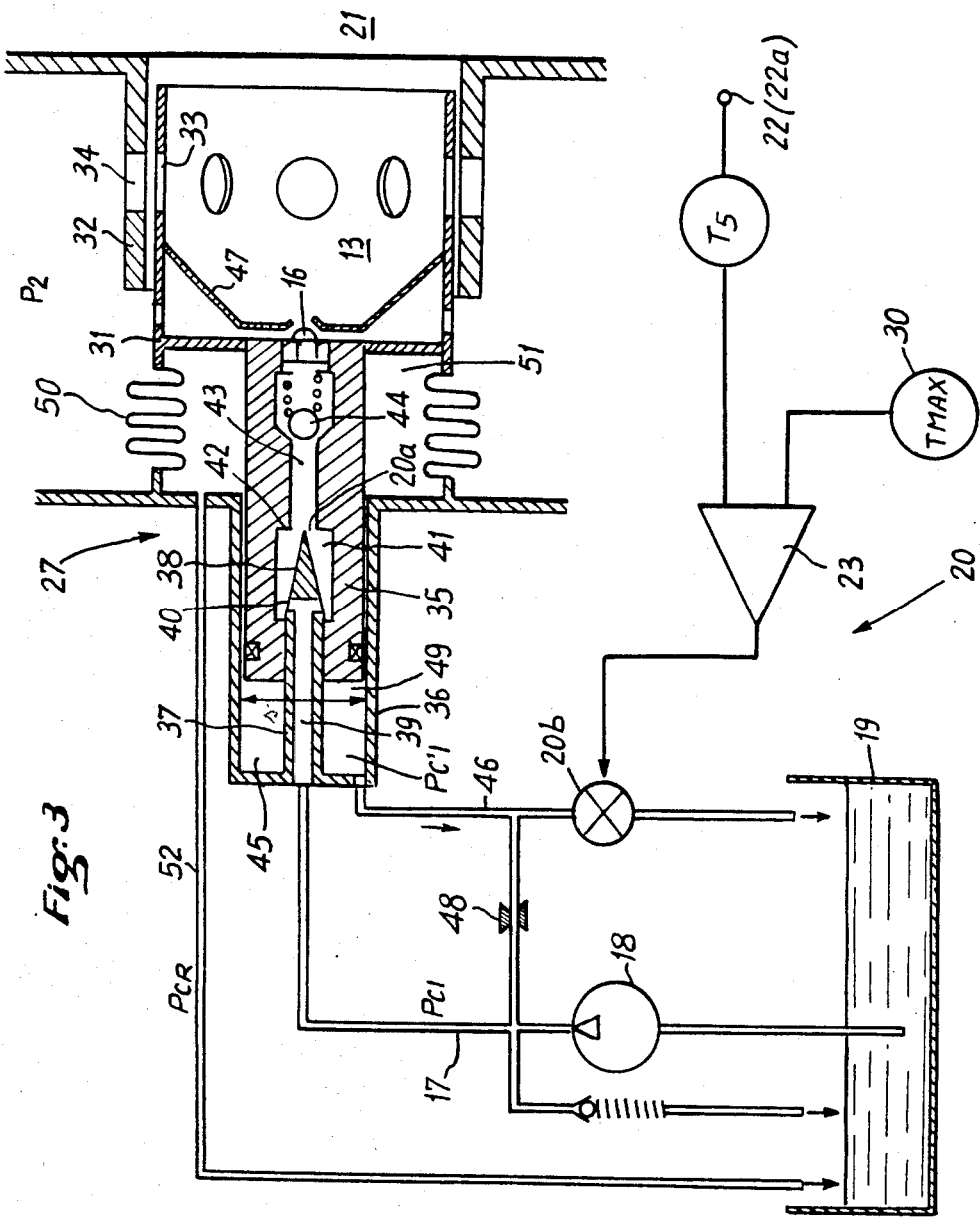

SUPERCHARGED INTERNAL COMBUSTION ENGINES HAVING A BYPASS CONDUIT AND AN AUXILIARY COMBUSTION CHAMBER WHICH ARE PROVIDED WITH A REGULATING SYSTEM

The invention relates to an internal combustion engine having work chambers of variable volume supercharged by a turbocompressor or turbocharger whose compressor air outlet communicates with the air inlet of the work chambers, said compressor being driven by a turbine whose gas inlet is connected to the gas outlet of the work chambers through at least one exhaust manifold, which engine includes a bypass conduit which puts the air outlet of the compressor in communication with the gas inlet of the turbine through an auxiliary combustion chamber which is divided in the upstream to downstream direction into a primary combustion zone and a secondary dilution zone and whose gas outlet communicates with the inlet of the turbine, said primary zone including at least one fuel supply nozzle connected to a source of fuel under pressure through fuel flow regulating means for the fuel admitted by said nozzle, said means being responsive to an operating parameter of the engine.

Further, said bypass conduit is preferably, but not exclusively, provided with throttling means having a variable passage section. Moreover, said internal combustion engine is preferably, but not exclusively, a Diesel engine and its work chambers are generally formed by cylinders whose volume is rendered variable by the displacement of the pistons. However, the invention is applicable, wholly or partly, to controlled ignition engines and in particular gas engines.

Such an engine is disclosed for example in FR-A No. 2,449,785 (MOTOREN- UND TURBINEN-UNION, M.T.U. (and in corresponding U.S. Pat. No. 4,389,846). In this case, the flow regulating means, which are responsive to the temperature of the gases immediately upstream of their entrance in the turbine, i.e. to the temperature of the mixture of the exhaust gases of the engine and the combustion gases of the auxiliary combustion chamber, are arranged in such manner as to reduce the quantity of fuel delivered to said chamber when said temperature exceeds a given threshold. As the auxiliary combustion chamber then operates with a great excess of air, the temperature of the gases produced would thus decrease and this would protect the turbine against risks of overheating.

An engine provided with similar regulating means is disclosed in U.S. Pat. No. 3,163,984 (DUMONT).

An object of the invention is to arrange that there is protected against risks of overheating, not only the turbine of the turbocompressor, but also and above all the internal combustion engine itself, which latter is just as sensitive as the turbine, if not more, to these risks.

In order to attain this object, the engine according to the invention is characterized in that said regulating means are so arranged as to act in the direction for increasing the fuel flow up to a maximum value, if at least one parameter characteristic of the thermal load of the engine exceeds, or has a tendency to exceed, a predetermined threshold ($T_{MAX}$) and in the direction for reducing the fuel flow down to a minimum value, which may be zero, if said characteristic parameter descends, or has a tendency to descend, below said threshold ($T_{MAX}$).

It will be understood from the expression "tendency to" that it is unnecessary to wait until the measured value has exceeded the threshold value to correct or preclude the effect of this fact of exceeding, but that this reaction may be anticipated, for example by taking into account in the known manner the derivative with respect to time of the order "n" of the difference between these two values.

"Parameter characteristic of the thermal load of the engine" is intended to mean a physical magnitude which varies in the same direction as this thermal load. Preferably, there is chosen as the parameter the temperature of the gases prevailing either at the outlet of the work chambers of the engine, or at at least one point of the exhaust manifold or manifolds, upstream of the junction between the bypass conduit and the inlet of the gases of the turbine. This parameter may be also the temperature of one or more component parts considered to be critical for the good operation of the engine (for example, the temperature of the exhaust valve seats or of the top of the liner of the cylinders), the information received being for example processed by known electronic calculating means so as to act in an appropriate manner in real time on the flow of the fuel in the auxiliary combustion chamber and to take into account in particular the thermal inertias proper to the measurement. "Parameter characteristic of the thermal load of the engine" may also mean, for example, a characteristic index of the chemical composition of the combustion gases leaving the work chambers of the engine, upstream of the crossing of the communication of the bypass conduit with the gas inlet of the turbine; this index may be in particular the opacity of these combustion gases.

By an inverse solution of the known solutions, i.e. by an increase in the fuel flow instead of a decrease under similar circumstances, the invention permits a protection of both the turbine and the engine, which underlines the inventive activity of the present invention. The solution afforded by the latter is derived from the observation that a turbocompressor turbine is "automatically protected by its compressor". Indeed, the inlet temperature of the turbine, which is the image of the energy of the gases entering the turbine, is a function of the air pressure delivered by the compressor. Due to the existence of the bypass conduit, this function may be bi-univocal. The variation of the inlet temperature of the turbine (or energy of the gases entering the turbine) versus the air pressure delivered by the compressor is said to be "bi-univocal" when to any given value of said inlet temperature corresponds one value only of said air pressure and conversely when to any given value of said air pressure corresponds one value only of said inlet temperature. In other words, if the energy entering the turbine undergoes an increase (coming either from the engine or from the auxiliary combustion chamber) by causing a temporary increase in the temperature in front of the turbine, this accelerates the turbine and consequently the compressor and therefore raises the air pressure, which increases the ratio of the masses between the air and the fuel in the engine and/or the auxiliary combustion chamber and consequently moderates within acceptable limits the increase in the temperature in front of the turbine. As concerns the engine itself, its heating depends on the ratio between the air flow and the fuel flow which it receives, i.e. on the ratio between the supercharging air pressure and the torque developed by the engine. If the heating of the latter is excessive, this therefore means that its supercharging pressure is insufficient for a given torque, and this insufficiency is remedied, in accordance with the invention, by an increase in the fuel flow admitted into the auxiliary combustion chamber. Finally, the invention protects the engine from risks of overheating and leaves the turbine under the natural protection of the compressor, as explained hereinbefore.

On the other hand, in the known solution mentioned before (MTU, DUMONT), it is quite possible to be in a situation in which the temperature of the gases at the inlet of the turbine and downstream of the junction with the bypass conduit, will fall short of the acceptable limit values due to the dilution of the exhaust gases of the engine by the fresh air circulating in the bypass conduit, while the exhaust gases of the engine, upstream of this junction, which is symptomatic of a thermal overload of the engine, will exceed the acceptable values, bearing in mind the torque developed by the engine and the available supercharging air pressure.

Note that FR-A No. 2,284,766 (FRENCH STATE) (and corresponding U.S. Pat. No. 4,114,379) discloses regulating means for preventing the mass ratio between the air and the fuel admitted into the engine from descending below the value in respect of which the maximum temperature reached by the gases in the cylinders of the engine becomes unacceptable by controlling the value of the minimum threshold of the supercharging pressure by the quantity of fuel injected into the engine per cycle, but these means are clearly different from those of the invention. In acting on the quantity of fuel injected per cycle, these means were found to be delicate to use and difficult to construct. For a given torque of the engine, the quantity of fuel injected per cycle is not constant and it is consequently difficult to cause the speed to act.

The invention will now be described in more detail with reference to the accompanying drawings which diagrammatically illustrate preferred embodiments of the invention.

FIG. 1 of these drawings diagrammatically represents an internal combustion engine arranged according to a first embodiment.

Figure 2:
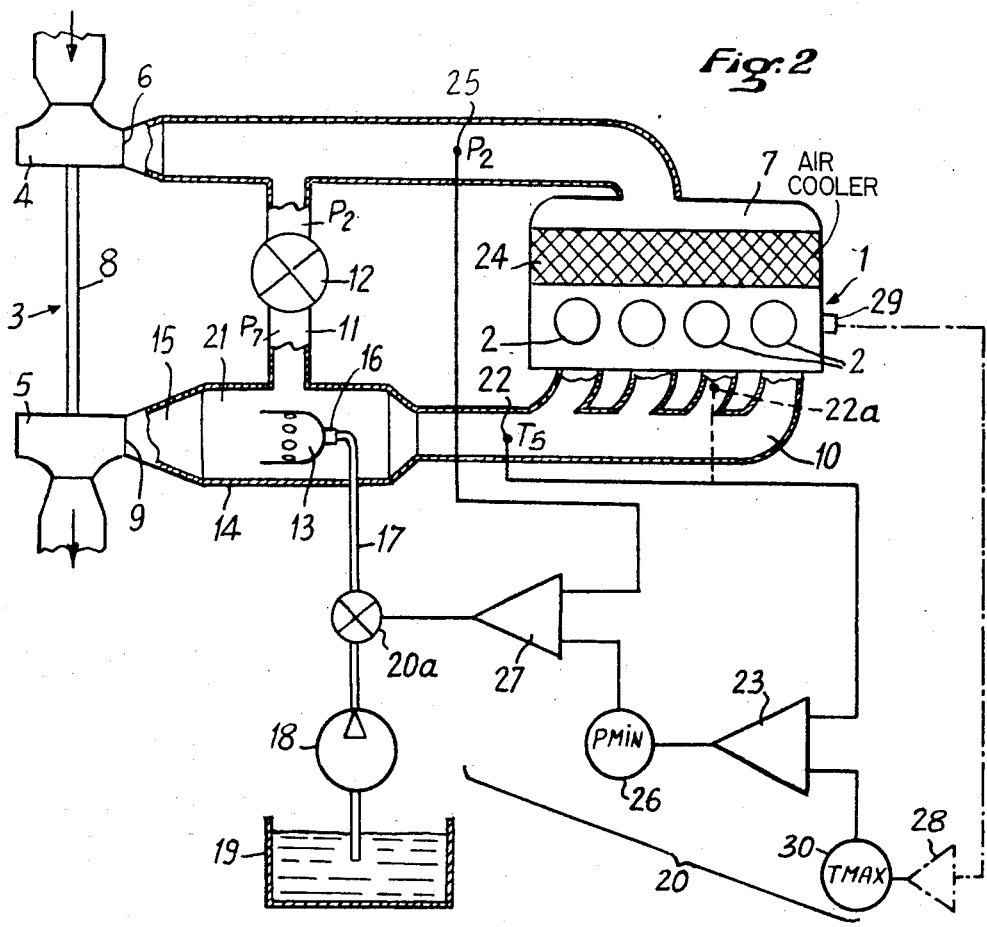

FIG. 2 is a view similar to FIG. 1 representing an internal combustion engine arranged according to a second embodiment.

FIG. 3 diagrammatically represents some of the elements of an internal combustion engine designed according to a modification of the embodiment shown in FIG. 2.

Figure 4:
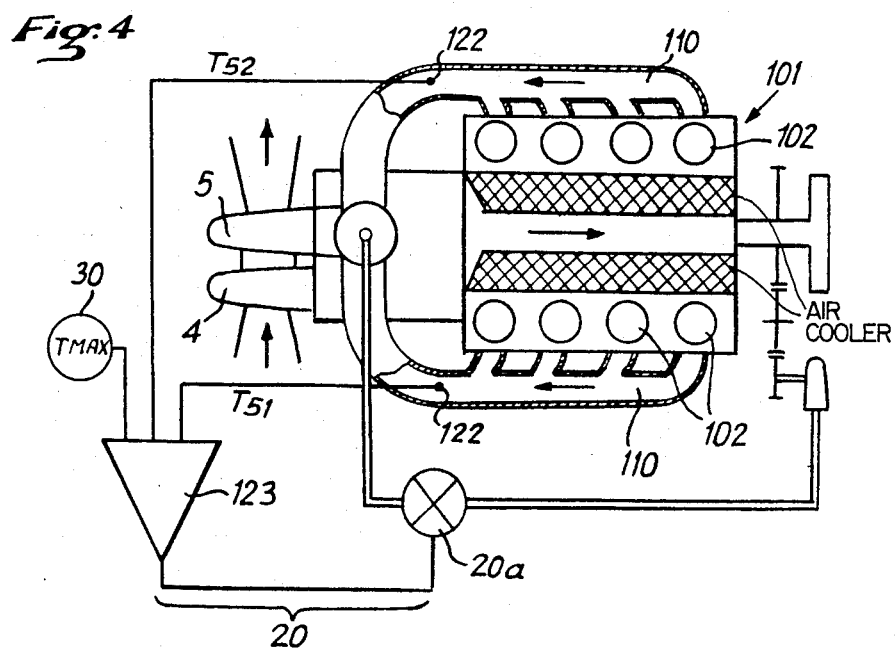

FIG. 4 is a simplified diagrammatic view of an internal combustion engine arranged according to a third embodiment.

The supercharged Diesel engine 1 shown in FIG. 1 comprises work chambers 2 of variable volume, each generally formed by a cylinder whose volume is rendered variable by the displacement of a piston. This engine 1 is supercharged by a turbocharger or turbocompressor unit 3 mainly comprising a turbine 5 and a compressor 4 whose outlet 6 communicates with the air inlet of the work chambers 2, through at least one intake manifold 7. A supercharging air cooler 24 is generally disposed downstream of the intake manifold 7. The compressor 4 is driven mechanically, for example through a shaft 8, by the turbine 5 whose gas inlet 9 is connected to the gas outlet of the work chambers 2 through at least one exhaust manifold 10.

The engine 1 includes a bypass conduit 11 preferably, but not exclusively, provided with throttling means 12 having a variable passage section which puts the air outlet 6 of the compressor 4 in communication with the gas inlet 9 of the turbine 5 through an auxiliary combustion chamber 14 which is divided in the upstream to downstream direction into a primary combustion zone 13 and a secondary dilution zone 21. This auxiliary combustion chamber 14 includes a gas outlet 15 which communicates with the gas inlet 9 of the turbine 5. The primary combustion zone 13 includes at least one fuel supply nozzle 16 which is connected through a pipe 17 to a source of fuel under pressure 18 (such as a pump drawing fuel from a tank 19) and through fuel flow regulating means 20, these means 20 being responsive to an operating parameter of the engine. These means 20 comprise, in the known manner, a device 20a for regulating the fuel flow, which may be a jet having a variable passage section or a jet having a variable cyclic opening time, or any other like means.

The throttling means 12 and the auxiliary combustion chamber 14 are preferably arranged according to the teaching of FR-A No. 2,472,082 (and corresponding U.S. Pat. No. 4,330,860). In particular, the throttling means 12 are preferably so adapted as to establish a pressure drop $P_2-P_7$ ($P_2$ and $P_7$ being the pressures respectively prevailing upstream and downstream of the throttling means 12) which is substantially independent of the ratio between the air flow in the bypass conduit 11 and the air flow delivered by the compressor 4 but which varies in the same direction as said pressure $P_2$. The secondary dilution zone 21 terminates in the gas outlet 15. With the aid of throttling means (not shown in FIG. 1; however an example thereof will be described with reference to FIG. 3), the air flow introduced in the auxiliary combustion chamber 14 is divided between the primary zone 13 and secondary zone 21 in such manner as to adapt the air flow admitted into the primary zone 13 to the fuel flow introduced by the supply nozzle 16. One may refer to FR-A No. 2,472,082 and to various other patents of the FRENCH STATE to obtain further details concerning the throttling means 12 and the auxiliary combustion chamber 14.

For the purpose of protecting against risks of overheating both the engine 1 and the turbine 5, the engine 1 is characterized in that the regulating means 20 are so arranged as to act in the direction for increasing the flow of the fuel delivered by the supply nozzle 16 up to a maximum value, if a parameter characteristic of the thermal load of the engine 1 exceeds, or has a tendency to exceed, a predetermined threshold ($T_{MAX}$) and in the direction for reducing this fuel flow down to a minimum value, if said characteristic parameter descends, or has a tendency to descend, below said threshold ($T_{MAX}$).

Said operating parameter of the engine which, according to the teaching of FR-A No. 2,449,785 (and corresponding U.S. Pat. No. 4,389,846 referred to hereinbefore, is the temperature of the gases immediately upstream of their entrance into the turbine, is constituted, according to the invention, by a parameter characteristic of the thermal load of the engine 1, this last-mentioned parameter being generally also a temperature but measured in another place of the engine, preferably at the gas outlet of the work chambers 2, upstream of the crossing of the communication of the bypass conduit 11 with the gas inlet 9 of the turbine 5.

Two possibilities are illustrated in FIG. 1 as concerns this parameter characteristic of the thermal load of the engine. There may be used for this purpose either a temperature probe 22 placed at a point of the exhaust manifold 10 so as to measure therein the temperature $T_5$ (as shown in full lines in FIG. 1), or a temperature probe 22a placed at the outlet of at least one of the work chambers 2 of the engine 1 (as shown in dotted lines in FIG. 1). According to a modification (not shown) such a temperature probe could also be placed on one or more component parts of the engine which are suitably chosen, for example the seat of the exhaust valves (placed between each of the work chambers 2 and the exhaust manifold 10) or the cooling jacket or sleeve of the cylinders of the work chambers 2. The information received by this temperature probe or probes, such as 22 or 22a, is processed by known electronic calculating means 23 so as to act on the fuel flow introduced into the auxiliary combustion chamber 14. FIG. 1 diagrammatically shows these calculating means 23 by a comparator whose two inputs respectively receive the information of the probe or probes such as 22 or 22a and an information which is representative of the threshold $T_{MAX}$ and whose output sends a control signal to the fuel flow regulating device 20a.

Shown in FIG. 2 is a second embodiment in which elements similar to those of the foregoing embodiment and designated by the same reference numbers and letters will not be described again. In this second embodiment the flow regulating means 20 responsive to a parameter characteristic of the thermal load of the engine 1 (probe 22 or 22a), are also responsive to the supercharging pressure $P_2$ (measured by a pressure probe or sensor 25) at any point between the air outlet 6 of the compressor 4 and the gas inlet 9 of the turbine 5 and are adapted to act on the flow of fuel delivered by the supply nozzle 16, in the direction for increasing this flow up to a maximum value if the supercharging pressure $P_2$ drops below a pressure threshold $P_{MIN}$ and in the direction for reducing this flow to a minimum value if the supercharging pressure $P_2$ exceeds said threshold $P_{MIN}$. The regulating means, which are responsive to the parameter characteristic of the load of the engine 1 (probe 22 or 22a), act on the threshold value $P_{MIN}$ in the direction for increasing this threshold up to a maximum value if this parameter characteristic of the thermal load of the engine 1 exceeds said threshold $T_{MAX}$, and in the direction for decreasing this threshold to a minimum value, if said parameter drops below said threshold $T_{MAX}$.

According to the embodiment shown in FIG. 2, the regulation of the pressure and the regulation of the temperature are effected electronically, with a cascade regulation. For this purpose, as in the embodiment shown in FIG. 1, a first comparator 23 receives at its inputs respectively the information of the temperature $T_5$ (probe 22 or 22a) and the information of $T_{MAX}$, but its output is not connected directly to the fuel flow regulating device 20a but to a regulating means 26 of the pressure threshold $P_{MIN}$ as a function of the output signal of the comparator 23. A second comparator 27 receives on its two inputs respectively the supercharging pressure signal delivered by the probe 25 and the pressure threshold signal delivered by the regulating means 26, and it is the output of this second comparator 27 which is connected to the flow regulating device 20a.

According to an improvement shown in dot-dash lines in FIG. 2, the threshold $T_{MAX}$ is variable. For this purpose, the engine 1 advantageously comprises threshold regulating means $T_{MAX}$ responsive to the speed of the engine and capable of controlling the threshold value $T_{MAX}$ by means of the speed of rotation N of the engine in accordance with a pre-established law:

$$T_{MAX}=f(N)$$

These means for regulating the threshold $T_{MAX}$ are diagrammatically represented in FIG. 2 by a programmer 28 which receives at its input the signal coming from a sensor 29 of the speed N of the engine and whose output is connected to the signal generator 30 representative of the value $T_{MAX}$.

The programmer may be responsive to a plurality of operating parameters of the engine, such as its speed of rotation N and a value P representative of the supercharging pressure $P_2$ according to a law $$T_{MAX}=g(N,P)$$

Indeed, in respect of each torque value delivered by the engine and a given speed of rotation N, there exists a single minimum value of the supercharging pressure $P_2$ in respect of which the exhaust temperature T5 and the value of the smoke index (opacity of the exhaust gases) will both remain short of their respective limits. A chart $T_{MAX}=g(N,P)$ may be drawn up by means of which it will be ensured that the required torque will be delivered without smoke if there is allotted to $T_{MAX}$ the measured value of T5 to which a smoke index less than or equal to a predetermined maximum value is observed.

The value P representative of the supercharging pressure $P_2$ may be the value of a pressure measured at any point between the air outlet 6 of the compressor 4 and the gas inlet 9 of the turbine 5.

FIG. 3 illustrates a modification of the embodiment shown in FIG. 2 in which only the temperature comparator 23 is of the electronic type while the pressure comparator 27 is of mechanical or hydropneumatic type. In FIG. 3, the primary combustion zone 13 of the auxiliary combustion chamber 14 is shown.

As described in FR-A No. 2,265,979 (and corresponding U.S. Pat. No. 4,026,115), the primary zone 13 is limited by a cylindrical sleeve 31 which is axially movable inside a fixed, coaxial, cylindrical sleeve 32. The movable sleeve 31 is provided with a ring arrangement of orifices 33 which coincide, to a more or less large proportion, with orifices 34 arranged in a ring on the outer sleeve 32. The supercharging air is delivered by the compressor 4 at pressure $P_2$ on the outer surface of the fixed sleeve 32. The orifices 33 and 34 together form said throttling means capable of dividing the air flow introduced into the auxiliary combustion chamber 14 between the primary combustion zone 13 and the secondary dilution zone 21.

The supply nozzle 16 is carried by a plunger 35 which slides in a cylindrical sleeve 36. The delivery pipe 17 of the fuel pump 18 communicates with the interior of a hollow needle valve 37 which is carried by the bottom of the sleeve 36 and terminates in a conical point 38. The inner passageway 39 of the hollow needle 37 communicates through lateral orifices 40 with a chamber 41 formed inside the plunger 35. This chamber 41 is connected, through a shoulder or seat 42, to an inner passageway 43 which communicates, through a check-valve 44, with the nozzle 16. The fixed conical needle 38 cooperating with the movable seat 42 together constitute the flow regulating device 20a for the fuel admitted into the nozzle 16.

Further, the annular cavity 45 between the bottom of the sleeve 36 and the end of the plunger 35 communicates through the pipe 46 with the outlet of the pump 18 through the fixed jet 48 and with the return to the tank 19 through the variable jet 20b. "Variable jet" is intended to mean any known device for varying the flow therethrough, such as a jet having a variable passage section or a jet having a constant section with a variable cyclic opening. Depending on the state of the opening of the variable jet 20b, the pressure PC'1 prevailing in the cavity 45 will be between the pressure PC'1 prevailing at the outlet of the pump 18 and the return pressure PCR to the tank 19. This pressure PC'1 acting on the surface s of the front side 49 of the plunger 35 will balance the supercharging pressure P2 applied to the differential section S of the bellows 50 and the sleeve 35 as described in FR-A No. 2,265,979 (and corresponding U.S. Pat. No. 4,026,115). The cavity 51 between this bellows 50 and the sleeve 35 communicates with the tank at pressure PCR through the pipe 52 and collects the leakages of liquid between the sleeve 36 and the plunger 35.

When the forces are balanced, there is obtained:

$$(P2 - PCR) S = (PC'1 - P2) s$$

namely:

$$P2 = \frac{PC'1\, s + PCR\, S}{S + s}$$

The adjustment, by means of the comparator 23, of the opening of the variable jet 20b consequently permits a variation of the reference pressure PC'1 and, consequently, the supercharging pressure $P_2$ to a threshold value $$(I) - PMIN = \frac{PC'1\, s + PCR\, S}{S + s}$$

This has in fact produced a hydro-pneumatic comparator equivalent to the electronic comparator 27 shown in FIG. 2. If, for a given operation of the engine (given speed and torque), the value T5 of the parameter characteristic of the thermal load of the engine has a tendency to exceed the threshold value $T_{MAX}$, the comparator 23 acts on the variable jet 20b in the direction for closing.

The pressure PC'1 prevailing in the cavity 45 will therefore rise and this increases the value of $P_{MIN}$ according to the formula (I) and, in acting on the surface 49 of the plunger 35, has a tendency to shift the latter toward the right and thus open the variable jet 20a. The flow of fuel introduced into the chamber through the nozzle 16 increases and this will accelerate the turbine and consequently increase the supercharging pressure P2 until the balance between P2 and $P_{MIN}$ is once again re-established. The increase thus achieved in the air pressure admitted into the work chambers will increase the value of the massic ratio between the air and the fuel in these chambers until the parameter T5 drops below the threshold $T_{MAX}$.

FIG. 4 represents a third embodiment in which the taking of the temperature T5 is effected in a multiple manner, in a number equal to the number of exhaust manifolds, and the parameter characteristic of the load of the engine in the arithmetic mean of these temperatures.

By way of example, it has been assumed that this engine 101 has two exhaust manifolds 110 respectively corresponding to two rows of work chambers 102. These manifolds 110 are both connected to an auxiliary combustion chamber similar to the chamber 14 of the foregoing embodiments. A temperature probe 122, similar to the probe 22 of the foregoing embodiments, is then disposed in each of the exhaust manifolds 110. The temperature signals $T_{51}$ and $T_{52}$ are respectively sent by the two probes 122 to the electronic calculating means 123 which calculate the arithmetic mean of these signals which compare this means with the signal delivered by a generator of $T_{MAX}$ similar to the generator 30 of the foregoing embodiments.

The embodiment shown in FIG. 4 easily lends itself to the prevention and detection of operating incidents.

Thus, the regulating means responsive to the temperatures representative of the thermal load of the engine ($T_{51}$ and $T_{52}$) may be so arranged as to effect the comparison by a difference between these various temperatures and to eliminate the lowest temperature in the case of a detection of a difference exceeding a given threshold and to signal by a suitable message the temperature whose measurement was eliminated. This permits taking the required steps for remedying the ascertained anomaly (defect in the corresponding temperature probe or insufficient supply of fuel of the corresponding row of work chambers 102).

Whatever embodiment chosen, the fuel flow regulating means 20, responsive to the parameter characteristic of the thermal load of the engine, can be so arranged that, if the value of this parameter exceeds a maximum value higher than the threshold $T_{MAX}$, the fuel flow admitted through the supply nozzle is increased imperatively until its maximum value is reached and an appropriate signal is delivered for indicating this fact of exceeding this maximum value higher than the threshold $T_{MAX}$.

What is claimed is:

1. An internal combustion engine having work chambers of variable volume, supercharged by a turbocompressor whose air outlet of the compressor communicates with the air inlet of the work chambers, said compressor being driven by a turbine whose gas inlet is connected to the gas outlet of the work chambers through at least an exhaust manifold, which engine comprises a bypass conduit putting the air outlet of the compressor in communication with the gas inlet of the turbine through an auxiliary combustion chamber which is divided in the upstream to downstream direction into a primary combustion zone and a secondary dilution zone and whose gas outlet communicates with the inlet of the turbine, said primary zone comprising at least one fuel supply nozzle connected to a source of fuel under pressure through fuel flow regulating means for the fuel admitted by said nozzle, said regulating means being responsive to an operating parameter of the engine, wherein said regulating means are so arranged so as to act in the direction for increasing the fuel flow up to a maximum value, if at least a parameter characteristic of the thermal load of the engine exceeds, or has a tendency to exceed, a predetermined threshold $T_{MAX}$, and in the direction for reducing the fuel flow down to a minimum value, if said characteristic parameter drops, or has a tendency to drop, below said threshold $T_{MAX}$.

2. An internal combustion engine according to claim 1 wherein said operating parameter characteristic of the thermal load of the engine is the temperature of the gases at the gas outlet of the work chambers, taken at least upstream of the crossing of the communication of the bypass conduit with the gas inlet of the turbine.

3. An internal combustion engine according to claim 2 wherein the temperature of said gases is taken downstream of the grouped gas outlets of the work chambers of the engine.

4. An internal combustion engine according to claim 1 wherein said parameter characteristic of the thermal load of the engine is formed by the temperature of at least one component heated by the gases of combustion in the work chambers and the taking of this temperature is associated with electronic calculating means which are capable of taking into account the thermal inertias of said taking of the temperature.

5. An internal combustion engine according to claim 1 wherein said parameter characteristic of the thermal load of the engine is formed by an index which is a characteristic of the chemical composition of the combustion gases leaving the work chambers, upstream of the crossing of the communication of the bypass conduit with the gas inlet of the turbine.

6. An internal combustion engine according to claim 5 wherein said index is the opacity of said gases of combustion upstream of the crossing of the communication of the bypass conduit with the gas inlet of the turbine.

7. An internal combustion engine according to claim 1 wherein said fuel flow regulating means for the fuel admitted through said nozzle and responsive to said parameter which is a characteristic of the thermal load of the engine, are formed by a first comparator which compares the value of the parameter which is a characteristic of the thermal load of the engine with the value of said threshold $T_{MAX}$, and is adapted to act on a threshold value $P_{MIN}$ of a second comparator in the direction for increasing said threshold $P_{MIN}$ up to a maximum value, if said characteristic parameter of the thermal load of the engine exceeds, or has a tendency to exceed, said threshold $T_{MAX}$ in the direction for decreasing the threshold $P_{MIN}$ down to a minimum value, if said parameter drops, or has a tendency to drop, below said threshold $T_{MAX}$;

by a second comparator which compares with said threshold value $P_{MIN}$ the pressure prevailing at any point located between the air outlet of the compressor and the gas inlet of the turbine and is adapted to act on the flow of fuel admitted through said nozzle by means of the regulating means in the direction for increasing said flow up to a maximum value if the pressure at said point drops, or has a tendency to drop, below the value of said threshold $P_{MIN}$;

in the direction for decreasing said flow down to a minimum value, if the pressure at said point exceeds, or has a tendency to exceed, the value of said threshold $P_{MIN}$.

8. An internal combustion engine according to claim 7 wherein the threshold $T_{MAX}$ is variable.

9. An internal combustion engine according to claim 8 comprising means for regulating the threshold $T_{MAX}$ and responsive to the speed of the engine and capable of causing the value of the threshold $T_{MAX}$ to be controlled by the speed of rotation of the engine according to a predetermined law:

$$T_{MAX} = f(N)$$

10. An internal combustion engine according to claim 8 comprising means for regulating the threshold $T_{MAX}$ and responsive to the speed of rotation of the engine and to the pressure at any point located between the air outlet of the compressor and the gas inlet of the turbine and capable of causing the value of the threshold $T_{MAX}$ to be controlled by the speed of rotation and the pressure according to a predetermined law:

$$T_{MAX} = g(N,P).$$

11. An internal combustion engine according to claim 3 wherein the measurement of the characteristic parameter of the thermal load of the engine is effected in a multiple manner, in a number equal to the number of exhaust manifolds, and the characteristic parameter of the thermal load of the engine is the arithmetic mean of said measured values.

12. An internal combustion engine according to claim 11 wherein the regulating means responsive to said measured values are adapted in such manner as to effect the comparison by the difference of said various measured values, to eliminate the lowest measured value in the case of detection of a difference exceeding a given threshold and to signal by a suitable message the value whose measurement is eliminated.

13. An internal combustion engine according to claim 1 wherein the fuel flow regulating means responsive to the characteristic parameter of the thermal load of the engine are so adapted that, if the value of said parameter exceeds a maximum value higher than the threshold $T_{MAX}$, the flow of fuel admitted through the supply nozzle is increased imperatively to its maximum value and a suitable signal is delivered for indicating said fact of exceeding said maximum value.

* * * * *